United States Patent
Nichols et al.

(10) Patent No.: US 7,274,973 B2
(45) Date of Patent: Sep. 25, 2007

(54) HVAC/R MONITORING APPARATUS AND METHOD

(75) Inventors: Jared G. Nichols, Belpre, OH (US); Paul T. Corbman, Vincent, OH (US)

(73) Assignee: Invisible Service Technicians, LLC, Milford, OH (US)

( * ) Notice: Subject to any disclaimer, the term of this patent is extended or adjusted under 35 U.S.C. 154(b) by 10 days.

(21) Appl. No.: 11/006,035

(22) Filed: Dec. 7, 2004

(65) Prior Publication Data

US 2005/0125102 A1 Jun. 9, 2005

Related U.S. Application Data

(60) Provisional application No. 60/527,903, filed on Dec. 8, 2003.

(51) Int. Cl.
 *G05D 23/00* (2006.01)
(52) U.S. Cl. .................................. 700/276; 700/275
(58) Field of Classification Search ........ 700/275–276; 62/127, 129; 340/870.01, 506
See application file for complete search history.

(56) References Cited

U.S. PATENT DOCUMENTS

| | | | |
|---|---|---|---|
| 4,497,031 A | 1/1985 | Froehling et al. | |
| 4,555,057 A | 11/1985 | Foster | |
| 4,685,615 A * | 8/1987 | Hart | 236/94 |
| 4,724,435 A | 2/1988 | Moses et al. | |
| 5,491,473 A | 2/1996 | Gilbert | |
| 5,596,507 A | 1/1997 | Jones et al. | |
| 5,729,990 A * | 3/1998 | Basse et al. | 62/128 |
| 6,059,195 A | 5/2000 | Adams et al. | |
| 6,147,601 A | 11/2000 | Sandelman et al. | |
| 6,160,477 A | 12/2000 | Sandelman et al. | |
| 6,211,782 B1 | 4/2001 | Sandelman et al. | |
| 6,385,510 B1 * | 5/2002 | Hoog et al. | 700/276 |
| 6,437,691 B1 | 8/2002 | Sandelman et al. | |
| 6,437,692 B1 | 8/2002 | Petite et al. | |
| 6,453,687 B2 | 9/2002 | Sharood et al. | |
| 6,462,654 B1 | 10/2002 | Sandelman et al. | |
| 6,502,411 B2 | 1/2003 | Okamoto | |
| 6,535,123 B2 | 3/2003 | Sandelman et al. | |
| 6,626,366 B2 | 9/2003 | Kayahara et al. | |
| 6,717,513 B1 | 4/2004 | Sandelman et al. | |
| 6,955,302 B2 * | 10/2005 | Erdman, Jr. | 236/51 |
| 7,225,054 B2 * | 5/2007 | Amundson et al. | 700/276 |
| 2005/0240312 A1 * | 10/2005 | Terry et al. | 700/276 |

OTHER PUBLICATIONS

Shiyuuhei, Nagasumi. Machine translation of Japanese Publication No. 09-026344. Filed Dec. 7, 1995.*

* cited by examiner

*Primary Examiner*—Leo Picard
*Assistant Examiner*—Alexander Kosowski
(74) *Attorney, Agent, or Firm*—Ronald J. Richter; Hasse & Nesbitt LLC

(57) ABSTRACT

An apparatus and method for monitoring the operation of a heating, ventilation, air conditioning and/or refrigeration (HVAC/R) system includes a first computer located on or near the HVAC/R system and a plurality of sensors positioned to sense various operating parameters of the HVAC/R system. The sensors communicate the sensed parameters to the first computer. When the first computer detects a condition of the HVAC/R system that requires attention, based on parameters sensed by the sensors, the first computer communicates with a second computer located remote from the first computer and transmits a message related to the condition.

24 Claims, 4 Drawing Sheets

HVAC/R MONITORING APPARATUS AND METHOD

CROSS-REFERENCE TO RELATED APPLICATIONS

This application claims the benefit of co-pending U.S. Provisional Application No. 60/527,903, filed Dec. 8, 2003.

FIELD OF THE INVENTION

The present invention relates generally to heating, ventilation, air conditioning and/or refrigeration (HVAC/R) systems, and more particularly to an apparatus and method for monitoring HVAC/R systems.

BACKGROUND OF THE INVENTION

Heating, ventilation, air conditioning and/or refrigeration systems are widely used to regulate the temperature of buildings and other facilities, such as residential homes, office buildings, storage facilities, and other structures where it is desired to heat or cool the facility. In such applications, it is important to ensure that the mechanical systems for heating or cooling the facility are properly maintained. Specifically, it is known that the operating efficiency of a HVAC/R system decreases dramatically with even a minimal lack of maintenance to the system. As the system's efficiency decreases, the capacity of the system to heat or cool the facility decreases. Moreover, as the operating efficiency and capacity of the HVAC/R system decrease, the cost of operating the HVAC/R system increases. Conversely, a properly maintained HVAC/R system provides benefits in terms of lower operating costs and a longer service life.

When HVAC/R systems are not operating efficiently, or when they fail, the result is often discomfort to the persons residing in or utilizing the facilities, or even damage to property or the spoilage of perishable goods, such as food stored in a refrigerated system. In many situations, the failure or loss of use of an HVAC/R system can be avoided if the owner or user is aware of the impending problem. Unfortunately, homeowners and other users are often unaware of the operating efficiency of their HVAC/R systems or the warning signs of an impending failure, and are generally unable to repair the HVAC/R system themselves.

Many newer HVAC/R systems have a certain amount of built-in self-diagnostic capability to detect problems that affect performance. They include LED indicators which provide fault codes, otherwise known as flash codes or diagnostic trouble codes, which indicate to the user or service technician whether a malfunction exists and the type of malfunction that exists. When a fault is detected, the computer will illuminate the flash code lamp, and some systems may also store the diagnostic trouble code in its memory. To understand trouble codes, one often needs a reference manual that explains what the numbers mean and the step-by-step diagnostic procedure for isolating the fault. On some systems, a scan tool must be plugged into the computer system to access and read the codes. Therefore, even in systems with available flash codes, it is often necessary to have a skilled service technician come out to the home to read or determine the exact meaning of these codes.

Accordingly, when a problem does occur with an HVAC/R system, a visit by a trained service technician is usually required. Generally, the technician must travel to the location of the HVAC/R system to inspect the system and determine the source of the problem. Moreover, since it is impractical for service technician to have on hand all of the various components that might be necessary to restore the HVAC/R system to proper working order, the service technician must usually travel to another location to retrieve the necessary parts and subsequently return to the work location to repair the HVAC/R system. In the worst case, a part may not be readily available and must be ordered, whereby the service technician must return at a later date, further delaying repair and inconveniencing the owner or user of the system. This is particularly troublesome for HVAC/R systems which are located in remote areas.

While various devices for monitoring the operation of HVAC/R systems have been proposed, there is still a need for improved monitoring systems, and in particular for improved remote monitoring of HVAC/R systems with flash code capabilities, as will be described in more detail below.

SUMMARY OF THE INVENTION

The present invention provides an apparatus and method for monitoring an HVAC/R system to ensure that the HVAC/R system is operating efficiently and to alert service technician to potential problems with the system so that they can be addressed in a timely manner. Typically the monitoring apparatus includes a first computer located on or near the HVAC/R system and a plurality of sensors positioned at different places on the system to sense various operating data. The first computer receives the operating data or signals from the sensors and then compares this operating data to pre-programmed operating parameters. Such operating parameters are well-known by those skilled in the art and relate to proper functioning of the particular component of the HVAC/R system being monitored.

The first computer, after receiving operating data from a sensor, typically communicates with a second computer remote from the HVAC/R system. This communication can occur when the first computer detects problems with or decreased performance of one or more of the components of the HVAC/R system, or else at a scheduled frequency (e.g. hourly, daily, weekly or monthly). The second computer is typically where the operating or performance data of the HVAC/R are stored.

The second computer is typically in communication with one or more peripheral devices, through which alerts can be sent to a user or service technician. Thus, the service technician can be informed of and access information that has been received at the second computer relating to the operation of the HVAC/R system. The peripheral devices in communication with the second computer can be, but are not limited to, a third computer, an email service, a fax service, a pager service, or a cell phone. If the peripheral device is a third computer, the third computer can be accessible from the Internet, and can further be used to send instructions to the second computer related to the pre-programmed operating parameters. The second computer is then able to communicate with the first computer to alter or change those parameters. Further, the third computer can be used to send alert messages to service technician or the owner of the HVAC/R system via a different peripheral device.

In one aspect of the invention, the sensors typically include at least one of a temperature sensor, a pressure sensor, a liquid sensor, and an optical sensor. The temperature sensors typically include a first temperature sensor positioned proximate a supply air duct, a second temperature sensor positioned proximate a return air duct, a third temperature sensor positioned to sense the temperature of the outside environment, a fourth temperature sensor positioned to sense the air conditioning (A/C) fluid line temperature, a fifth temperature sensor positioned to sense the A/C suction line temperature, and a sixth temperature sensor positioned to sense the fan motor temperature. The pressure sensors typically include a first pressure sensor positioned on each side of an air filter to sense the pressure differential across the filter. The liquid sensors typically include a first liquid sensor positioned to detect the presence of liquid in an evaporator pan, a second liquid sensor positioned to detect liquid between the evaporator pan and a floor drain, and a third liquid sensor positioned in proximity with a sump pump. The optical sensors typically include a first optical sensor positioned to sense the operation of a UV lamp, a second optical sensor positioned to sense operation of a first flash code lamp, and a third optical sensor positioned to sense operation of a second flash code lamp.

In another aspect of the invention, the monitoring apparatus includes flash code readers having housings that can be placed over the first and second flash code lamps of the HVAC/R system. The second and third optical sensors, which determine operating data from the first and second flash code lamps, respectively, can be mounted in the housings of the flash code readers, such that the optical sensors are positioned to detect flash codes from the flash code lamps and transfer this data to the first computer. In yet another aspect of the invention, the monitoring apparatus includes housings for adjustably mounting the first liquid sensor to a sidewall of the evaporator pan.

In another aspect of the invention, the computers communicate with one another via a communications device. The first computer sends information to the second computer relating to the operation of the HVAC/R unit. The second computer will send the operating data to a peripheral device, such as a third computer. The second computer may request the peripheral device to respond to the operating data sent by the first computer by alerting service technician. If changes are necessary for the first computer they are sent to the second computer where they will be communicated to the first computer. For example, if the peripheral device is a third computer, the third computer can be used to send new operating parameters to the second computer, which can in turn communicate with the first computer to change the pre-programmed operating parameters and thus improve the relevance of the alerts. The communications device can include, but is not limited to, a modem whereby the computers may communicate over a telephone line. Other modes of communication between computers can be a serial port connection, or other wired or non-wired communications systems.

Advantageously, the apparatus of the present invention facilitates maintaining an HVAC/R system in optimum operating condition by alerting users and service technician to potential problems with the system. Accordingly, service technician having access to the information provided by the monitoring apparatus can determine the corrective action necessary to restore the HVAC/R system to proper working order, without having to first physically inspect the system. This ensures that the service technician will be better able to restore the system to proper working order in an efficient manner.

These and other features, objects and advantages of the invention will become more readily apparent to those of ordinary skill in the art upon review of the following detailed description, taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
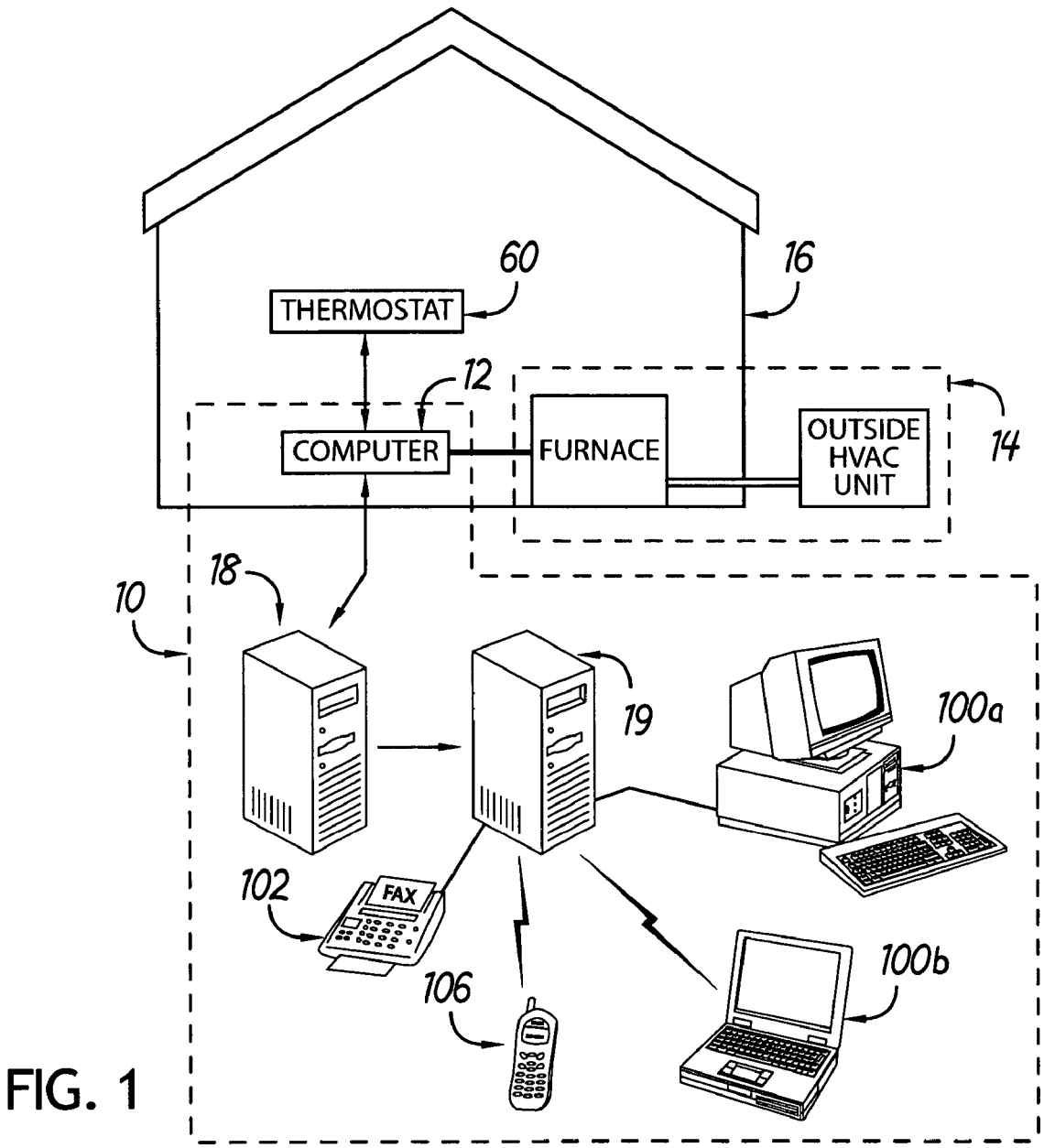
FIG. 1 is a schematic illustration depicting an exemplary monitoring apparatus according to the present invention.

Referring to FIG. 1, there is shown an exemplary monitoring apparatus 10 according to the principles of the present invention. The monitoring apparatus 10 includes a first computer 12 located proximate an HVAC/R system 14 of a building 16. The first computer 12 may be located on the structure of a component of the HVAC/R system 14, or it may be positioned at a location in the building 16 which is more readily accessible to service technician. The monitoring apparatus 10 further includes an array of sensors operatively coupled to various components of the HVAC/R system 14 for sensing various operating data of the HVAC/R system 14 and communicating this data to the first computer 12, as will be described more fully below. The monitoring apparatus 10 further includes a second computer 18, typically at a location remote from the first computer 12 and configured to receive communications from the first computer 12 related to the operating data of the HVAC/R system 14. The second computer 18 is also configured to store the operating data transferred from the first computer 12, and to respond to communications from the first computer 12, for example, by requesting that a peripheral device such as a third computer 19 notify service technician, or by sending instructions back to the first computer 12.

Figure 2:
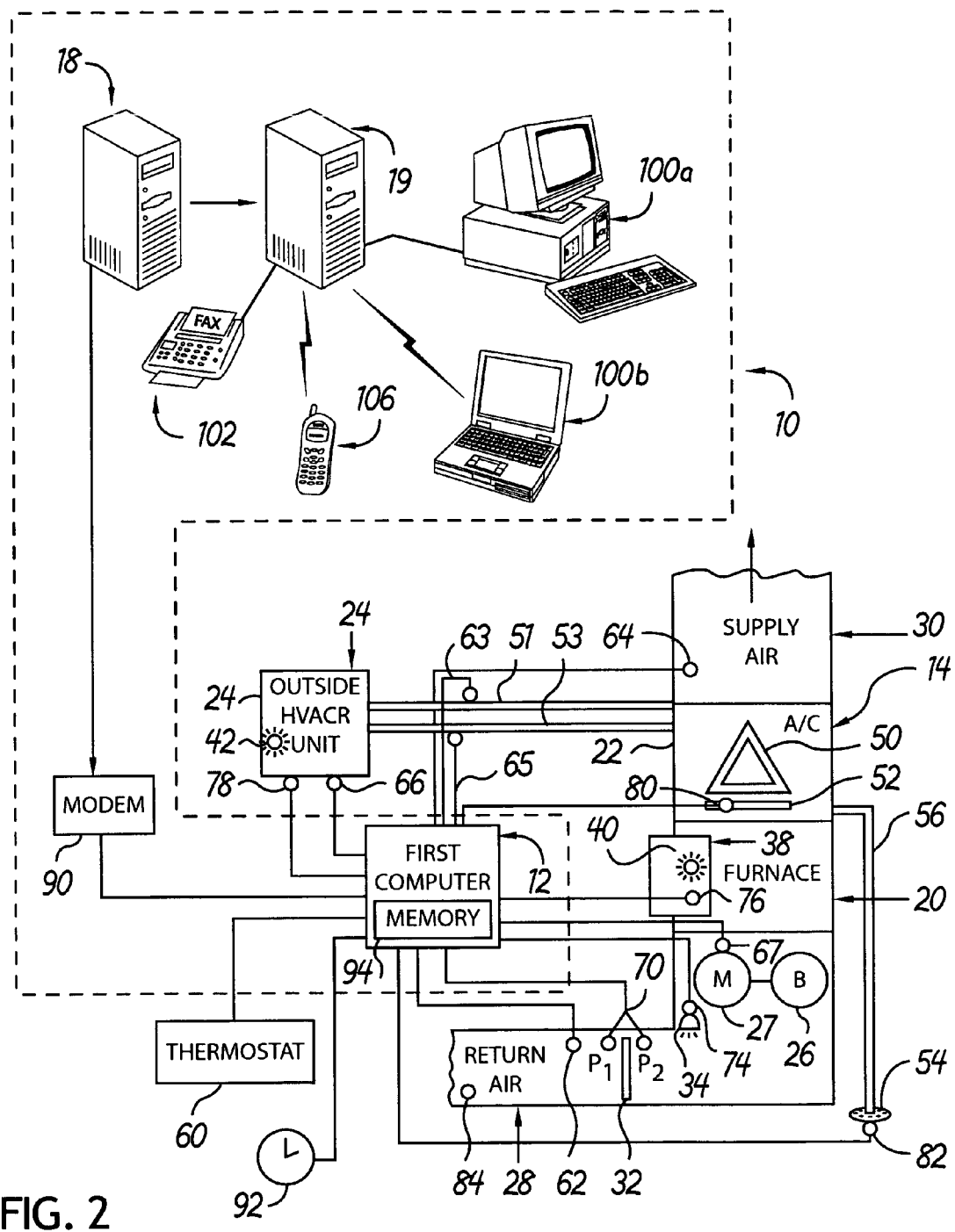
FIG. 2 is a detailed schematic of one embodiment of the monitoring apparatus of FIG. 1.

Referring now to FIG. 2, there is shown one embodiment of the monitoring apparatus 10. In the embodiment shown, the monitoring apparatus 10 is used in a forced-air HVAC/R system 14, but it will be recognized that the monitoring apparatus 10 may alternatively be used to monitor a hydraulic-based heating system, a refrigeration system, or other types HVAC/R systems with minor modification of the sensors, as will be understood by those skilled in the art. The HVAC/R system of FIG. 2 includes a furnace 20 and a split-system air conditioner comprising an interior air conditioning unit 22 and an outside air conditioning unit 24. The furnace 20 may be a gas-fired burner, an oil-fired burner, or it may be an electric furnace. The HVAC/R system 14 further includes a fan or blower 26, and fan motor 27. The fan motor 27 powers the blower 26, which draws air from a return air duct 28 and forces it through the furnace 20 and interior air conditioning (A/C) unit 22 to either heat or cool the air, and then through a supply air duct 30 which distributes the conditioned air through appropriate ductwork to outlet vents in a building, as known in the art. The HVAC/R system 14 further includes a filter 32 disposed between the return air duct 28 and the blower 26 to filter air drawn into the HVAC/R system 14, as known in the art. An ultraviolet light 34 is positioned between the return air duct 28 and the supply air duct 30 for killing insects and airborne germs which may enter the HVAC/R system 14.

The HVAC/R system further includes a control unit 38 for controlling the operation of the furnace 20, the interior A/C unit 22, the outside A/C unit 24 and the blower 26 to heat or cool the air drawn into the HVAC/R system 14. The control unit 38 is adapted to provide an indication of proper operation of the HVAC/R system 14 and/or errors sensed by the control unit 38 via a first LED lamp 40. An LED lamp is commonly referred to as a flash code lamp. Typically, the first flash code lamp 40 provides a visual indication of proper operation of the furnace 20, interior A/C unit 22, blower 26, and/or other components of the HVAC/R system 14 by remaining lit. When the control unit 38 detects an error in one of these components, the first flash code lamp 40 flashes in a specific pattern to indicate the detected error, as known in the art. The first flash code lamp 40 is generally positioned near or on the furnace 20 or interior A/C unit 22. A second flash code lamp 42 is also typically positioned on the outside A/C unit 24 to indicate the operating condition of the outside A/C unit 24.

While the first computer 12 is shown and described herein as a device separate from the control unit 38 of the HVAC/R system 14, it will be recognized that the first computer 12 may alternatively comprise an integral part of the HVAC/R control unit 38. In this regard, a first computer 12 that is separate and independent from the control unit 38 is an embodiment of the present invention that facilitates adding the monitoring apparatus 10 to an existing HVAC/R system 14. Likewise, an embodiment wherein the first computer 12 is integral with the control unit 38 is advantageous when the HVAC/R system 14 is to be provided with the monitoring apparatus 10, for example, directly from the manufacturer or distributor.

As illustrated in FIG. 2, the air conditioning portion of the HVAC/R system 14 further includes an evaporator coil 50 generally located within the interior A/C unit 22. The interior A/C unit 22 also includes an evaporator pan 52 for catching condensate which may form on and drip from the evaporator coil 50. The evaporator pan 52 is in fluid communication with a floor drain 54 by a conduit 56. The A/C system further includes a compressor and a condenser coil (not shown) which are generally located within the outside A/C unit 24, as known in the art. Further, the interior A/C unit 22 includes as part of its operation a fluid line 51 and a suction line 53 used to transfer coolant from the condenser coil to the evaporator coil 50 and back. One or more thermostats 60 are positioned at appropriate locations in the building to permit manual control of the HVAC/R system 14 to thereby regulate the temperature of the building, or individual rooms in the building, as desired.

With continued reference to FIG. 2, the monitoring apparatus 10 includes several sensors positioned at various locations on the HVAC/R system 14 to monitor the system for proper operation, as explained more fully below. The monitoring apparatus 10 is coupled to the thermostat 60 and receives signals from the thermostat 60 which indicate whether the HVAC/R system 14 has been set to heat or cool the building, and also whether or not the thermostat 60 is presently requesting the HVAC/R system 14 to heat or cool the building to bring the building or room to the set temperature of the thermostat 60. A first temperature sensor 62 is positioned at the return air duct 28 to sense the temperature of air provided to the HVAC/R system 14. A second temperature sensor 64 is positioned at the supply air duct 30 to sense the temperature of the air supplied by the HVAC/R system 14 to the building. A third temperature sensor 66 is positioned outside of the building or facility for sensing the temperature of the outside environment, and can be located at any suitable place outside the controlled environment. In the exemplary embodiment shown, the third temperature sensor 66 is positioned near the outdoor A/C unit 24. A fourth temperature sensor 63 is positioned on the A/C fluid line, a fifth temperature sensor 65 is positioned on the A/C suction line, and a sixth temperature sensor 67 is positioned on the fan motor 27.

A first pressure sensor 70, also known herein as a pressure differential sensor, is configured as a dual sensor able to sense air pressure differences across a distance, and is positioned on opposite sides of the air filter 32 to sense the change in pressure across the air filter 32. A first optical sensor 74 is positioned adjacent the UV lamp 34 to determine whether the UV lamp 34 is operating. A second optical sensor 76 is positioned near the first flash code lamp 40 to monitor the flash code indicated by the HVAC/R control unit 38. A third optical sensor 78 is positioned near the second flash code lamp 42 on the outdoor A/C unit 24 to monitor the condition indicated by the second flash code lamp 42. In one embodiment, the first, second, and third optical sensors are photocells, but it will be recognized that other types of optical sensors suitable for sensing operation of the UV lamp or sensing flash codes indicated by the flash code lamps may be used as well.

A first liquid sensor 80 is positioned in the evaporator pan 52 of the interior A/C unit 22 for sensing the presence of liquid condensate in the evaporator pan 52. A second liquid sensor 82 is positioned in the floor drain 54 for sensing the presence of liquid flowing from the outlet conduit 56 to the drain 54. Finally, the monitoring apparatus 10 typically includes a humidity sensor 84 for sensing the humidity of the air at the return air duct 28.

In use, the first computer 12 of the monitoring apparatus 10 receives signals from the various sensors which amount to operating data of the HVAC/R system. The first computer 12 receives the operating data in order to monitor operation of the HVAC/R system 14, and detects changes in operation which may indicate the need for servicing of the HVAC/R system 14. In the embodiment shown, the first computer 12 monitors the thermostat 60 to determine if heating or cooling of the building has been requested. The first computer 12 also monitors the first and second temperature sensors 62, 64 to ensure that the temperature of the air passing through the return and supply ducts 28, 30 is within a predetermined range. For example, typically the return air temperature should not be below about 50° F. or above about 100° F., and these parameters are pre-programmed into the circuitry of the first computer 12. If the return air temperature sensor 62 senses a temperature outside these limits, then the first computer 12 typically transmits a message to the second computer 18 indicating that the static temperature of the building is out of range.

The first computer 12 can also evaluate the difference in temperature sensed by the supply and return temperature sensors 62, 64 to determine whether the change in temperature is within a specified range. For example, if the difference in temperature between the supply and return temperature sensors 62, 64 is outside the specified range, the first computer 12 will typically generate an error signal, which is transmitted to the second computer 18. Alternatively, the first computer 12 may be configured to retest the temperature to determine whether the out-of-range problem persists. The first computer 12 may also be configured to evaluate signals received from the various other sensors to thereby troubleshoot the problem which may be causing the out of range error. Results of the troubleshooting evaluation performed by the first computer 12 may also be transmitted to the second computer 18.

The first computer also receives operating data from the A/C fluid line temperature sensor 63 and the A/C suction line temperature sensor 65 and evaluates the data against pre-programmed low and high limits. If the A/C fluid line or suction line temperatures are outside these pre-programmed temperature parameters, then an alert is generated by the first computer 12 and communicated to the second computer 18 via a communications device, or modem 90. For example, the temperature window for the A/C fluid line temperature may initially be set at about 50° F. to about 145° F. (about 110° C. to about 65° C.), and the window for A/C suction line temperature may initially be set at about 18° F. to about 95° F. (about −8° C. to about 35° C.). The first computer can also check the fan motor temperature through its sensor 67 and evaluate the temperature of the fan motor 27 against a high limit, which is typically initially set at about 176° F. (about 80° C.), and if the fan motor 27 temperature is above this limit, the first computer 12 then generates and communicates an alert to the second computer 18.

The first computer 12 can also be configured to check the pressure differential sensor 70 to evaluate the condition of the air filter 32. If the difference in pressure across the air filter 32 is greater than a preprogrammed value, then the first computer 12 generates an alert or error signal which is communicated to the second computer 18 to indicate that the filter may require service or replacement. For example, the parameters of the pressure differential sensor can be programmed such that an error signal may be generated if the pressure difference across the air filter 32 is greater than approximately 0.5-inch of water (0.00127 kg/cm$^2$).

The first optical sensor 74 is monitored to determine whether the UV lamp 34 is lit. This is particularly advantageous when the UV lamp 34 is located at a position in the HVAC/R system 14 where proper operation of the UV lamp 34 is not readily detectable. In conventional systems, when the UV lamp 34 burns out or is not operating properly, the HVAC/R system 14 will continue to operate without killing germs and/or bugs in the system until failure of the UV lamp 34 has been detected by physical inspection. Advantageously, the first optical sensor 74 provides a timely indication when the UV lamp 34 is not operating.

The first computer 12 also monitors the second and third optical sensors 76, 78 to detect flash code signals produced by the control unit 38 relating to the operation of the furnace 20 and the indoor and outdoor A/C units 22, 24. Advantageously, operating data in the form of fault code or flash code regarding the functioning of the furnace 20 and A/C units 22, 24 may be sensed by the second and third optical sensors 76, 78 and relayed to the first computer 12, which thereafter transmits this information to the second computer 18 for proper evaluation, as may be required. This is particularly useful in HVAC systems in which the flash code lamps 40, 42 are not readily visible, or perhaps not easily accessible, from outside the units. Moreover, because the control units of most conventional HVAC/R systems are configured to reset after an access cover for the furnace 20 or air conditioner 22, 24 is removed, a previously indicated error condition will be erased when the door is opened, and a service technician must wait until the error repeats before a determination of the error can be made. Advantageously, the first computer 12 can transmit detected flash code signals to the second computer 18 for remote access by a service technician, without requiring the technician to travel to the location of the HVAC/R system 14. This allows the service technician to remotely diagnose any faulty functioning of the components under the control of the control unit 38 and to respond accordingly, prior to the technician having to physically visit the facility housing the HVAC/R system.

Figure 3:
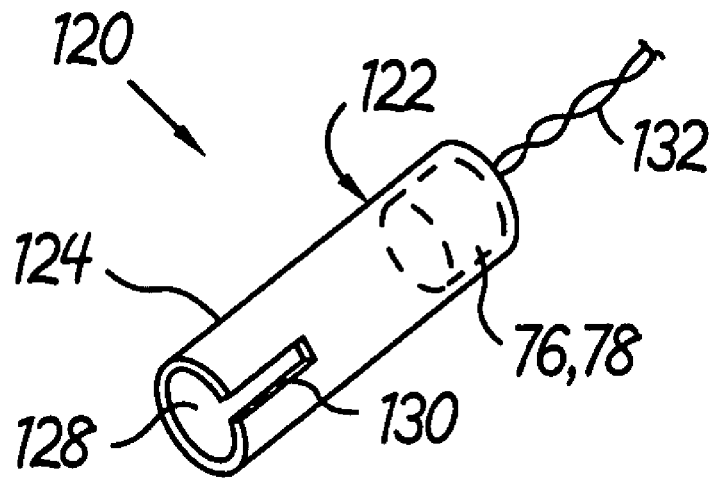
FIG. 3 is a perspective view of an exemplary flash code reader according to the present invention.
Figure 3A:
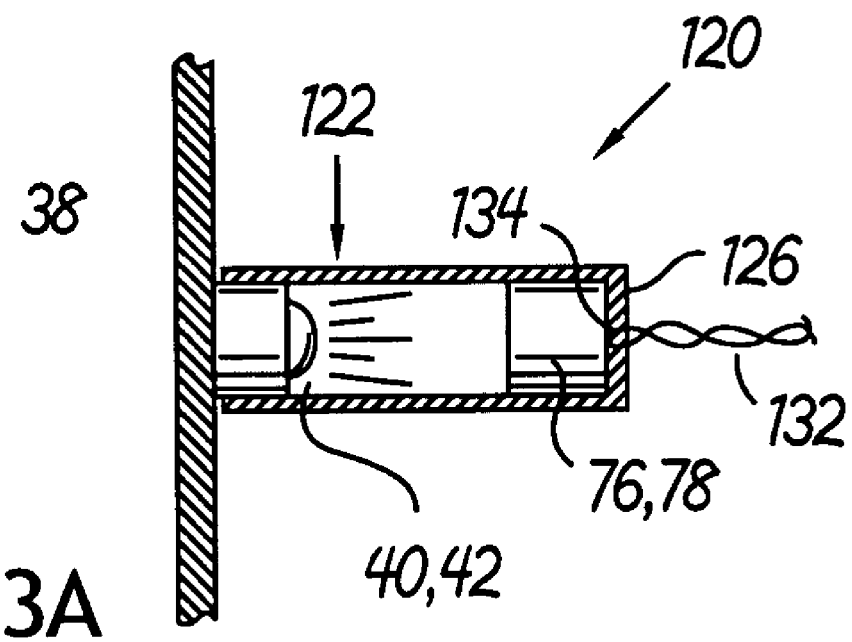
FIG. 3A is a cross-section view of the flash code reader of FIG. 3, depicted in a typical installation.

In another embodiment, depicted in FIGS. 3 and 3A, the monitoring apparatus 10 includes one or more holders 120 configured to locate the second and third optical sensors 76, 78 adjacent the first and second flash code lamps 40, 42 for monitoring the flash codes indicated by the respective lamps. Each holder 120 comprises an elongate tubular housing 122, typically formed from a hardened plastic such as PVC, and is defined by a sidewall 124, a rear wall 126, and an open end 128. The open end 128 of the housing 122, opposite the rear wall 126, is sized to fit securely over the flash code lamps 40, 42 which are mounted to the control unit 38 or another structure of the HVAC/R system. The holder 120 also typically includes lengthwise slots 130 formed in the sidewall 124 to facilitate expansion of the open end 128 for secure attachment of the housing 122 over the flash code lamps 40, 42.

As illustrated in FIGS. 3 and 3A, the holder 120 is typically able to mount one of the second and third optical sensors 76, 78 within its housing 122 and facing the open end 128, to thereby monitor the respective lamps 40, 42. Wires 132 from the optical sensors 76, 78 may be routed through an aperture 134 formed in the rear wall 126 of the housing 122 for coupling with the first computer 12, as required. Advantageously, the housing 122 may be fitted to an existing HVAC/R system 14 without the need to physically modify any original equipment of the HVAC/R system 14.

Figure 4:
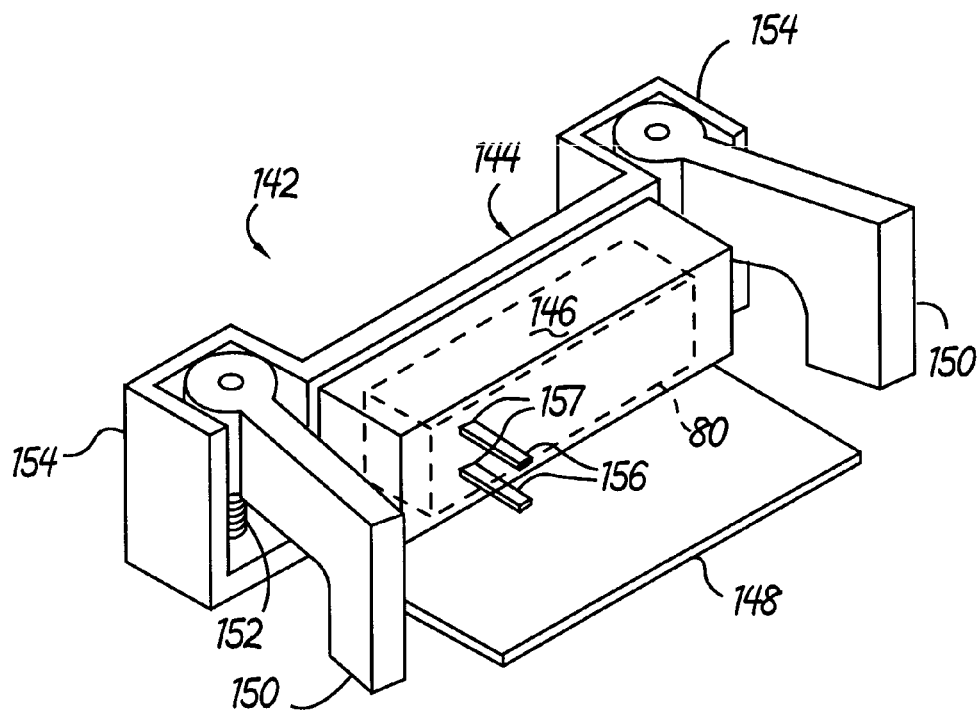
FIG. 4 is a perspective view of an exemplary liquid sensor according to the present invention.
Figure 5:
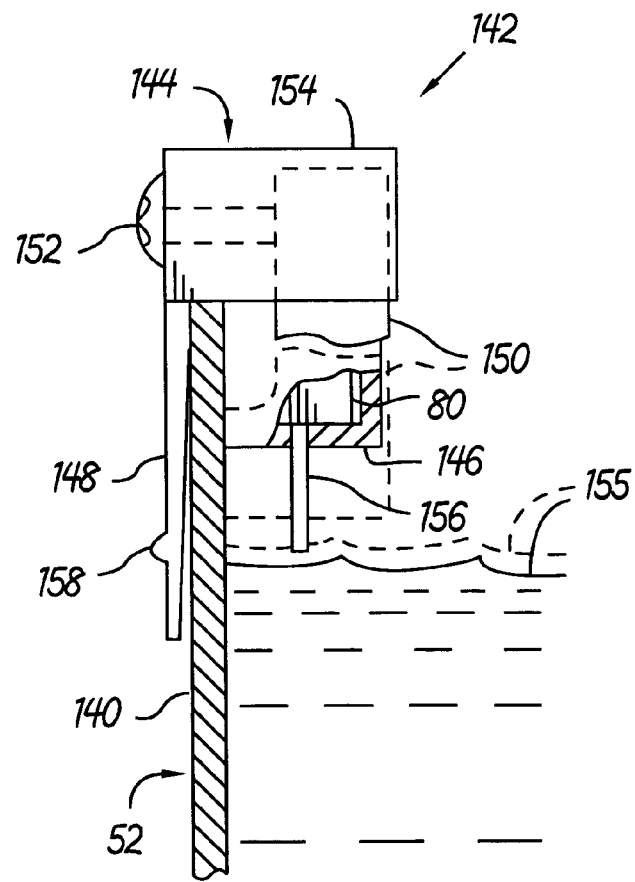
FIG. 5 is a cross-sectional view depicting a typical installation of the liquid sensor of FIG. 4.

FIGS. 4 and 5 illustrate an embodiment of housing 142 for the first liquid sensor 80, which is configured to be positioned in the evaporator pan 52. Looking at FIG. 5, the housing 142 is mounted to a sidewall 140 of the evaporator pan 52. The housing 142 typically has a generally rectangular-shaped base section 144 and a bottom cover 146 which cooperate to encapsulate the first liquid sensor 80. A flat, rectangular brace 148 extends downwardly from a side edge of the base section 144 and is spaced from the bottom cover 146 such that the housing 142 may be mounted over the top edge of the sidewall 140 of the evaporator pan 52, with the brace 148 and the first liquid sensor sensor 80 disposed on opposite sides of the sidewall 140, as depicted in FIG. 5. As is best seen in FIG. 4, the housing 142 is typically secured to the sidewall of the evaporator pan by a pair of L-shaped clamp arms 150 disposed on opposite longitudinal ends of the base section 144, and threadably secured to the housing 142 by fasteners 152 installed through bosses 154 extending from the respective longitudinal ends of the base section 144.

Looking at FIG. 5, the first liquid sensor 80 is actuated when the level of liquid 155 in the evaporator pan 52 rises to contact a pair of sensing probes 156 extending through apertures 157 in the bottom cover 146 and into the pan 52. The housing 142 may further include indicia 158 formed on the brace 148 to indicate the level at which the liquid will actuate the sensor 80. Advantageously, the housing 142 may be adjusted to any position on a sidewall 140 of the evaporator pan 52, as may be desired, and secured with clamp arms 150. The indicia 158 facilitate adjustment of the housing to place the sensing probes 156 at a desired level for indicating liquid in the pan 52.

The first and second liquid sensors 80, 82 (FIG. 2) are monitored to determine proper operation of the evaporator coil 50 and the A/C unit 22, 24. In particular, when the A/C unit 22, 24 is not operating properly, such as when the refrigerant charge of the system is low, excessive condensation may be generated by the evaporator coil 50, or frost may build up on the evaporator coil 50 which subsequently produces a large quantity of liquid upon melting. Alternatively, if the passage between the evaporator pan 52 the floor drain 54 becomes obstructed, an undesirable quantity of liquid may accumulate in the evaporator pan 52. Advantageously, the first liquid sensor 80 produces a signal to indicate the presence of an undesirable amount of liquid in the pan 52 before the liquid overflows into the building. The second liquid sensor 82, positioned at the drain 54, generates a signal to indicate the flow of liquid between the outlet conduit 56, and the drain 54. Advantageously, a signal generated by the second liquid sensor 82 provides an indication of improper operation of the A/C unit 22, 24, for example, when an excessive amount of condensation is generated by evaporator coil 50 but is insufficient to actuate the first liquid sensor 80 in the evaporator pan 52 due to drainage through the conduit 56.

The monitoring apparatus typically further includes a communications device configured to permit communication between the first computer and the second computer. In the exemplary embodiment shown in FIG. 2, the communications device 90 is a modem which permits the first computer 12 to communicate with the second computer 18 via telephone lines. Alternatively, the communications device 90 may comprise other wired or non-wired communications systems, including a serial port connection between the first and second computer, cellular communication systems, radio frequency communication systems, microwave communication systems, or other communication systems capable of transmitting information between the first and second computers 12, 18. In one embodiment, the communications device also includes communication with peripheral devices or other computers which can communicate with the second computer.

Each of the sensors is connected to the first computer 12 through an interface with a circuit board within the first computer, either through temperature sensors, contact closures or thermostat closures. Such connections will be understood by those of skill in the art. In the present invention, there is typically included a sensor for at least each of the following components: a furnace, an interior air conditioner (A/C) unit, an outside A/C unit, a fan motor, a blower, a supply air duct, a return air duct, an A/C suction line, an A/C fluid line, an air filter, an evaporator, an evaporator pan, a floor drain, a thermostat, a UV lamp, a first flash code lamp, and a second flash code lamp.

The sensor connections will relay either analog information (e.g. readings of the temperatures of components such as the fan motor, the outside A/C unit, the return air duct, the supply air duct, the A/C suction line, and the A/C fluid line) or digital information (e.g. information regarding air filter pressure, flash code signals, or thermostat parameters) to the circuit board. The analog signals will be directly sent to the processor of the first computer, and the digital signals will be serialized by shift registers within the circuit board and thereafter sent to the processor. Once at the processor circuitry, the sensor information is processed by comparison to pre-programmed, factory default, system parameters. Further, a real-time clock 92, located within the processor, allows the incoming information to be "clocked in," so that the sensor information can be tracked over time.

The processed sensor information, if required due to scheduled timing or alarming, is sent from the processor to a modem 90, which transmits this data via a telephone line to the second computer 18. The second computer then stores this information, as well as transmits it to a third computer which communicates to other peripheral devices such as a computer or a pager. Further, the processed sensor information can be directly accessed via a serial port connection (not shown) with the first computer. That is, an auxiliary computer, such as a laptop computer brought to the HVAC/R site, can be directly connected to the first computer at the serial port and receive the processed sensor information. The workings of the modem 90 and the serial port connection will be understood by those of skill in the art.

It should be noted that the data sensed by the sensors is raw data that must be evaluated and/or interpreted by a knowledgeable end user, such as a service technician. The service technician then determines the appropriate course of action to take, based on the raw data. The first computer does not define, display, or generate instructions related to predictive maintenance. Further, although the data is "processed" by the processor of the first computer, this processing typically involves converting the digital and analog signals generated by the sensors into readable information for the technician to interpret. The first computer typically does not attempt to "make sense" of the data, but rather stores and transmits all raw operating data to the second computer. This operating data can later be retrieved and evaluated by the end user, either via a third computer or other peripheral device, or by a direct interface with the second computer. However, a third computer or peripheral device typically is not in direct communication with the first computer or any interface unit connected to sensors on the HVAC/R system.

In the exemplary embodiment shown in FIG. 2, the first computer 12 is configured to both send data to and receive data/instructions from the second computer 18. The data includes sensor information and/or simple error messages which are transmitted from the first computer 12 to the second computer 18. In response to this data, the technician may send information and/or instructions from the second computer 18 to the first computer 12, whereby the second computer 18 may be used to alter the pre-programmed operating parameters of the first computer 12. For example, the data communicated between the first and second computers 12, 18 can comprise a 200-character message which can be transmitted via a modem at 1200 baud rate in less than 20 seconds. The message may include the model and serial numbers of components of the HVAC/R system 14, the values of the pre-programmed system parameters, the values sensed by the various sensors, and any error messages or codes to be transmitted from the first computer 12 to the second computer 18.

In the embodiment shown in FIG. 2, the monitoring system further includes a device remote from the HVAC/R system 14 and peripheral to the second computer 18 in the form of a third computer 19. The third computer 19 is in communication with the second computer 18. In this embodiment, the first computer 12 sends information to the second computer 18 as described above. The third computer 19 then interfaces/communicates with the second computer 18, evaluates the information received and stored at the second computer 18, and determines if messages need to be sent to users and/or service technicians. The third computer 19 can be in communication with one or more other peripheral devices and/or services such as additional computers 100a, 100b, email services 100b, fax services 102, or cell phone/pager services 106 to permit communication of the messages to the users or service technicians. Alternatively, the third computer 19 does not evaluate the data and/or send messages, but rather a service technician or another computer in communication with the third computer 19 may perform these functions.

In another embodiment, included in FIG. 2, the monitoring apparatus 10 further includes a real time clock 92. The clock 92 is typically located in the circuitry of the first computer, and may be used to determine the time interval between various events monitored by the first computer 12, the duration of a monitored event, or to schedule the timing of various actions to be taken by the first computer 12. For example, the first computer 12 may be configured to recognize a failed attempt to communicate with the second computer 18, such as the presence of a busy signal when an attempt is made to communicate with the second computer 18 via the modem 90. Accordingly, the first computer 12 may be programmed to attempt subsequent communications with the second computer 18 after a predefined time interval in the event that a first attempt at establishing communications is unsuccessful.

The first computer 12 also includes a memory 94 for storing communication data. Accordingly, the first computer 12 may be programmed to maintain a data log in the memory 94, whereby a record of attempts to communicate with the second computer 18 are recorded. The first computer 12 may then transmit a message to the second computer 18 related to the record of attempts which were made to establish communications between the first and second computers 12, 18. While it is anticipated that the first computer 12, through the modem 90 will establish communications with the second computer 18 in the event an error is detected, the first computer 12 may also be programmed to establish communications with the second computer 18 according to a predetermined schedule, for example once a week, once a month or according to any other time schedule that may be desired. Regularly scheduled communications between the first and second computers 12, 18 to exchange data may be desired, for example, to obtain continuous maintenance data relating to the HVAC/R system 14. Furthermore, the second computer 18 may transmit information to the first computer 12 to modify the period set for scheduled communications so that the number of calls received at the second computer 18 from various other first computers 12 may be reduced or staggered to thereby permit system monitoring to occur more efficiently.

The real time clock 92 and memory 94 may also be utilized by the first computer 12 to record data relating to the operation of the HVAC/R system 14. For example, the first computer 12 may record the number of heating-degree days and/or cooling-degree days during a given time interval, based on the average temperature for each day in the time interval and the difference between the average temperature for those days and 65° F. (18° C.). As another example, the first computer may record the set temperature of the thermostat 60 and the number of hours of operation of the HVAC/R system 14 in cooling or heating modes for a given time interval. This data might be useful for determining problems with the HVAC/R system 14, or could be useful to establish a database for a specific HVAC/R system 14 from which the data was obtained. Alternatively, data obtained from several such HVAC/R systems 14 having remote monitoring apparatus 10 of the present invention installed may be useful to manufacturers or service technicians to determine characteristics of a group of HVAC/R systems 14 or the needs of a particular area.

In another embodiment, the second computer 18 can store the operating data and alert notifications on an Internet-connected computer, and the service technician can access this data at any time from a remote computer work station. Such an arrangement is useful to service personnel who can access error messages received at the second computer 18 and identify the location, model, and type of HVAC/R unit which has indicated the need for servicing, and schedule servicing of the HVAC/R system 14 in an efficient manner. Advantageously, the monitoring apparatus 10 enables service technicians to provide efficient service of the HVAC/R systems 14 by providing access to data received at the second computer 18. Accordingly, service technicians can diagnose the problems experienced by the HVAC/R system 14, and obtain any necessary tools, equipment or service parts necessary for servicing the HVAC/R system 14 even before traveling to the location of the HVAC/R system 14.

In another exemplary embodiment, the first computer 12 is configured such that pre-programmed system parameters for the various sensors coupled to the HVAC/R system 14 may be modified by service technician. In one embodiment, all parameters of the monitoring apparatus 10 may be set and adjusted via the communications device, or modem 90. In this embodiment, the monitoring apparatus 10 is accessible from an offsite location, for example at the second computer 18, or at another location or computer in communication with the second computer 18.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. An apparatus for monitoring operating data generated by components of a heating, ventilation, air conditioning and/or refrigeration (HVAC/R) system of a facility, the components configured to operate within pre-programmed operating parameters and including a UV lamp and a control unit comprising a first flash code lamp and a second flash code lamp, the apparatus comprising:

a plurality of sensors configured to sense operating data from the components of the HVAC/R system, the plurality of sensors including a first optical sensor positioned to sense the operation of the UV lamp, a second optical sensor positioned to sense operation of the first flash code lamp, and a third optical sensor positioned to sense operation of the second flash code lamp;

a first flash code reader comprising a housing for mounting the second optical sensor adjacent the first flash code lamp;

a second flash code reader comprising a housing for mounting the third optical sensor adjacent the second flash code lamp;

a first computer located on or near the HVAC/R system configured to store the pre-programmed operating parameters for the components and operable to receive the operating data from the sensors and to generate error messages when the operating data is outside the pre-programmed operating parameters;

a second computer located remotely from the HVAC/R system and operable to communicate with the first computer to receive and store the operating data and the error messages generated by the first computer; and a communications system configured to facilitate communications between the first computer and the second computer, wherein the first computer is physically integrated with the control unit, and wherein the control unit is operable to generate flash codes via the first flash code lamp and the second flash code lamp, the first flash code lamp operable to provide operating data in the form of a visual indication of the operation of a furnace, an interior A/C unit, and a blower, the second flash code lamp operable to provide operating data in the form of a visual indication of the operation of an outside A/C unit.

2. The apparatus of claim 1, wherein the first computer communicates the operating data and the error messages to the second computer only when the operating data is outside the pre-programmed operating parameters.

3. The apparatus of claim 1, wherein the first computer communicates the operating data to the second computer at a scheduled frequency.

4. The apparatus of claim 3, wherein the scheduled frequency of communication is selected from the group consisting of hourly, daily, weekly, and monthly.

5. The apparatus of claim 1, further comprising at least one peripheral device located remotely from the second computer and operable to communicate with the second computer to receive and store the operating data and the error messages stored by the second computer and to alert a user of the error messages.

6. The apparatus of claim 5, wherein the at least one peripheral device is selected from the group consisting of an additional computer, an email service, a fax service, a pager service, and a cell phone.

7. The apparatus of claim 6, wherein the peripheral device is a third computer, the third computer operable to be accessible from the Internet and to allow access of the operating data by the user.

8. The apparatus of claim 7, wherein the second computer is further operable to receive instructions from the third computer and to send the instructions to the first computer, the instructions relating to altering the pre-programmed operating parameters of at least one of the components of the HVAC/R system.

9. The apparatus of claim 1, wherein the first computer includes a real-time clock and a memory.

10. The apparatus of claim 9, wherein the first computer is configured to determine the number of heating-degree days and/or cooling-degree days using the real-time clock and memory.

11. The apparatus of claim 1, wherein each flash code reader includes an elongate tubular housing operable to mount an optical sensor therein, the tubular housing defined by a sidewall, a rear wall having an aperture, and an open end opposite the rear wall, the rear wall configured to secure the optical sensor within the flash code reader and facing the flash code lamp, the aperture configured to allow passage of wires connecting the optical sensor to the first computer, the open end configured to fit securely over the flash code lamp.

12. An apparatus for monitoring operating data generated by components of a heating, ventilation, air conditioning and/or refrigeration (HVAC/R) system of a facility, the components configured to operate within pre-programmed operating parameters and including at least one of a furnace, an interior air conditioner (A/C) unit, an outside A/C unit, a fan motor, a blower, a supply air duct, a return air duct, an A/C suction line, an A/C fluid line, an air filter, an evaporator, an evaporator pan, a floor drain, a thermostat, a UV lamp, and a control unit having a first flash code lamp and a second flash code lamp, the apparatus comprising:

a plurality of sensors, each sensor configured to sense operating data from one of the components of the HVAC/R system, the plurality of sensors comprising a first optical sensor positioned to sense the operation of the UV lamp, a second optical sensor positioned to sense operation of the first flash code lamp, and a third optical sensor positioned to sense operation of the second flash code lamp;

a first computer located on or near the HVAC/R system configured to store the pre-programmed operating parameters for the components and operable to receive the operating data from the sensors and to generate error messages when the operating data is outside the pre-programmed operating parameters;

a second computer located remotely from the HVAC/R system and operable to communicate with the first computer to receive and store the operating data and the error messages generated by the first computer; and a communications system configured to facilitate communications between the first computer and the second computer, wherein the first computer is physically integrated with the control unit, and wherein the control unit is operable to generate flash codes via the first flash code lamp and the second flash code lamp, the first flash code lamp operable to provide operating data in the form of a visual indication of the operation of the furnace, the interior A/C unit, and the blower, the second flash code lamp operable to provide operating data in the form of a visual indication of the operation of the outside A/C unit.

13. The apparatus of claim 12, wherein the plurality of sensors further comprises a first temperature sensor positioned proximate the supply air duct, a second temperature sensor positioned proximate the return air duct, a third temperature sensor positioned to sense the temperature of the environment outside the facility, a fourth temperature sensor positioned to sense the A/C fluid line temperature, a fifth temperature sensor positioned to sense the A/C suction line temperature, a sixth temperature sensor positioned to sense the fan motor temperature, a first pressure sensor positioned to sense the pressure differential across the air filter, a first liquid sensor positioned to detect the presence of liquid in the evaporator pan, a second liquid sensor positioned to detect liquid between the evaporator pan and the floor drain, and a humidity sensor positioned to sense the humidity of the air at the return air duct.

14. The apparatus of claim 12, the monitoring apparatus further including a first flash code reader and a second flash code reader, the first flash code reader comprising a housing for mounting the second optical sensor adjacent the first flash code lamp, the second flash code reader comprising a housing for mounting the third optical sensor adjacent the second flash code lamp.

15. The apparatus of claim 14, wherein each flash code reader includes an elongate tubular housing operable to mount an optical sensor therein, the tubular housing defined by a sidewall, a rear wall having an aperture, and an open end opposite the rear wall, the rear wall configured to secure the optical sensor within the flash code reader and facing the flash code lamp, the aperture configured to allow passage of wires connecting the optical sensor to the first computer, the open end configured to fit securely over a flash code lamp.

16. The apparatus of claim 15, wherein the sidewall includes at least one lengthwise slot, the at least one lengthwise slot operable to facilitate expansion of the open end for secure attachment of the elongate tubular housing over the flash code lamp.

17. The apparatus of claim 12, wherein the plurality of sensors further comprises a first liquid sensor, the apparatus further including a housing for adjustably mounting the first liquid sensor to a sidewall of the evaporator pan, the first liquid sensor being contained within the housing and positioned to detect the presence of liquid in the evaporator pan.

18. The apparatus of claim 17, the housing including a base section having a side edge, a bottom cover, and a brace extending downwardly from the side edge of the base section and spaced from the bottom cover such that the housing is operable to be mounted over the sidewall of the evaporator pan with the brace and sensor disposed on opposite sides of the sidewall, the housing secured to the sidewall of the evaporator pan by a pair of clamp arms disposed on opposite longitudinal ends of the base section and threadably secured to the housing by fasteners installed through bosses extending from the respective longitudinal ends of the base section.

19. The apparatus of claim 18, wherein the first liquid sensor is actuated when the level of liquid in the evaporator pan rises to contact a pair of sensing probes extending through apertures in the bottom cover and into the pan.

20. The apparatus of claim 19, wherein the housing further includes indicia formed on the brace to indicate the level at which the liquid will actuate the sensor.

21. A method for monitoring operating data generated by components of a heating, ventilation, air conditioning and/or refrigeration (HVAC/R) system of a facility, the components of the HVAC/R system including a UV lamp and a control unit having a first flash code lamp and a second flash code lamp, a plurality of sensors configured to sense operating data from the components of the HVAC/R system, the plurality of sensors comprising a first optical sensor positioned to sense the operation of the UV lamp, a second optical sensor positioned to sense operation of the first flash code lamp, and a third optical sensor positioned to sense operation of the second flash code lamp, the method comprising:

configuring the HVAC/R system components to operate within pre-programmed operating parameters;

generating flash codes via the first flash code lamp and the second flash code lamp, the flash codes from the first flash code lamp providing operating data in the form of a visual indication of the operation of a furnace, an interior A/C unit and a blower, and the second flash code lamp providing operating data in the form of a visual indication of the operation of an outside A/C unit;

sensing operating data and the flash codes generated by the plurality of sensors;

communicating the operating data from the sensors to a first computer;

communicating the operating data from the first computer to a second computer;

generating and then communicating error messages if the operating data is outside the pre-programmed operating parameters;

storing the operating data and error messages in the second computer;

allowing access of the operating data and the error messages by a user; and sending an alert to the user through at least one peripheral device when an error message is generated.

22. The method of claim 21, wherein the components of the HVAC/R system further include at least one of a furnace, an interior air conditioner (A/C) unit, an outside A/C unit, a fan motor, a blower, a supply air duct, a return air duct, an A/C suction line, an A/C fluid line, an air filter, an evaporator, an evaporator pan, a floor drain, a thermostat.

23. The method of claim 22, wherein the plurality of sensors further comprises a first temperature sensor positioned proximate the supply air duct, a second temperature sensor positioned proximate the return air duct, a third temperature sensor positioned to sense the temperature of the environment outside the facility, a fourth temperature sensor positioned to sense the A/C fluid line temperature, a fifth temperature sensor positioned to sense the A/C suction line temperature, a sixth temperature sensor positioned to sense the fan motor temperature, a first pressure sensor positioned to sense the pressure differential across the air filter, a first liquid sensor positioned to detect the presence of liquid in the evaporator pan, a second liquid sensor positioned to detect liquid between the evaporator pan and the floor drain, a humidity sensor positioned to sense the humidity of the air at the return air duct.

24. The method of claim 21, the components of the HVAC/R system further including a first and a second flash code reader, the first flash code reader comprising a housing for mounting the second optical sensor adjacent the first flash code lamp, the second flash code reader comprising a housing for mounting the thrid optical sensor adjacent the second flash code lamp.

* * * * *

UNITED STATES PATENT AND TRADEMARK OFFICE
CERTIFICATE OF CORRECTION

| | |
|---|---|
| PATENT NO. | : 7,274,973 B2 |
| APPLICATION NO. | : 11/006035 |
| DATED | : September 25, 2007 |
| INVENTOR(S) | : Jared G. Nichols et al. |

Page 1 of 1

It is certified that error appears in the above-identified patent and that said Letters Patent is hereby corrected as shown below:

Column 6, line 15, delete "filler" and insert --filter--.

Claim 24, line 47, delete "thrid" and insert --third--.

Signed and Sealed this

Fifteenth Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,274,973 B2  
APPLICATION NO. : 11/006035  
DATED : September 25, 2007  
INVENTOR(S) : Jared G. Nichols et al.

Page 1 of 1

It is certified that error appears in the above-identified patent and that said Letters Patent is hereby corrected as shown below:

Column 6, line 15, delete "filler" and insert --filter--.

Column 16, Claim 24, line 47, delete "thrid" and insert --third--.

This certificate supersedes the Certificate of Correction issued April 15, 2008.

Signed and Sealed this

Sixth Day of May, 2008

JON W. DUDAS  
*Director of the United States Patent and Trademark Office*